US012726859B2

(12) United States Patent
Dai et al.

(10) Patent No.: US 12,726,859 B2
(45) Date of Patent: Sep. 1, 2026

(54) METHOD AND APPARATUS FOR MULTICAST AND BROADCAST SERVICES

(71) Applicant: LENOVO (BEIJING) LIMITED, Beijing (CN)

(72) Inventors: Mingzeng Dai, Beijing (CN); Lianhai Wu, Beijing (CN); Congchi Zhang, Shangahi (CN); Le Yan, Shanghai (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 250 days.

(21) Appl. No.: 18/260,550

(22) PCT Filed: Jan. 8, 2021

(86) PCT No.: PCT/CN2021/070953
§ 371 (c)(1),
(2) Date: Jul. 6, 2023

(87) PCT Pub. No.: WO2022/147790
PCT Pub. Date: Jul. 14, 2022

(65) Prior Publication Data
US 2024/0056901 A1 Feb. 15, 2024

(51) Int. Cl.
*H04W 36/00* (2009.01)

(52) U.S. Cl.
CPC ... *H04W 36/0007* (2018.08); *H04W 36/0016* (2013.01)

(58) Field of Classification Search
CPC ..... H04W 36/00; H04W 36/02; H04W 36/08; H04W 36/30; H04W 4/08; H04W 4/06;
(Continued)

(56) References Cited

U.S. PATENT DOCUMENTS 8,665,826 B2 * 3/2014 Dimou ................ H04W 36/302 455/436
9,686,770 B2 * 6/2017 Hsu ....................... H04W 72/30
(Continued)

FOREIGN PATENT DOCUMENTS

CN 101047966 A 10/2007
CN 101242573 A 8/2008
(Continued)

OTHER PUBLICATIONS

International Searching Authority, "Written Opinion of the International Searching Authority," PCT/CN2021/070953, Aug. 20, 2021, pp. 1-3.

(Continued)

*Primary Examiner* — Man U Phan
(74) *Attorney, Agent, or Firm* — Kunzler Needham & Hilton

(57) ABSTRACT

Embodiments of the present application are related to a method and apparatus for multicast and broadcast services. An exemplary method of the present application includes: receiving multicast and broadcast services (MBS) data associated with a user equipment (UE) in a first node, wherein the MBS data is delivered via a shared delivery mode in a wireless network; receiving, in the first node, handover acknowledge information from a second node, the handover acknowledge information indicating that a handover request associated with the UE is allowed; and determining, in the first node, whether to forward the MBS data to the second node by the first node, in response to receiving the handover acknowledge information from the second node.

13 Claims, 7 Drawing Sheets

(58) Field of Classification Search
CPC ....... H04W 4/60; H04W 76/12; H04W 76/19; H04W 76/20; H04W 76/32; H04W 76/40; H04W 48/16; H04L 1/18
USPC .......................................................... 370/312
See application file for complete search history.

(56) References Cited

U.S. PATENT DOCUMENTS

| | | | | |
|---|---|---|---|---|
| 11,638,185 B2 * | 4/2023 | Li | H04W 36/249 370/331 |
| 11,991,562 B2 * | 5/2024 | Xu | H04W 36/0007 |
| 12,082,056 B2 * | 9/2024 | Yiu | H04W 36/00692 |
| 12,114,336 B2 * | 10/2024 | Hong | H04W 36/0007 |
| 12,207,080 B2 * | 1/2025 | Wang | H04W 76/12 |
| 12,395,907 B2 * | 8/2025 | Babaei | H04W 36/00837 |
| 2010/0067490 A1 | 3/2010 | Chiu | |
| 2022/0124583 A1 * | 4/2022 | Wang | H04W 76/12 |
| 2023/0224679 A1 * | 7/2023 | Diao | H04W 36/0044 370/329 |
| 2023/0319649 A1 * | 10/2023 | Zhu | H04W 36/0007 370/312 |
| 2023/0403760 A1 * | 12/2023 | Pham Van | H04W 76/40 |
| 2024/0031066 A1 * | 1/2024 | Shirivastava | H04W 4/06 |

FOREIGN PATENT DOCUMENTS

| | | |
|---|---|---|
| CN | 101674531 A | 3/2010 |
| CN | 111510964 A | 8/2020 |
| WO | 2018162947 A1 | 9/2018 |

OTHER PUBLICATIONS

3GPP, "3rd Generation Partnership Project; Technical Specification Group Services and System Aspects; Architectural enhancements for 5G multicast-broadcast services; Stage 2; (Release 17)", 3GPP TS 23.247 V0.1.0, Mar. 2021, pp. 1-35.
3GPP, "3rd Generation Partnership Project; Technical Specification Group Radio Access Network; NR; NR and NG-RAN Overall Description; Stage 2 (Release 16)", 3GPP TS 38.300 V16.3.0, Sep. 2020, pp. 1-148.
3GPP, "3rd Generation Partnership Project; Technical Specification Group Radio Access Network; NR; Medium Access Control (MAC) protocol specification (Release 16)", 3GPP TS 38.321 V16.2.0, Sep. 2020, pp. 1-154.
3GPP, "3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.
3GPP, "3rd Generation Partnership Project; Technical Specification Group Radio Access Network; NG-RAN; Xn application protocol (XnAP) (Release 16)", 3GPP TS 38.423 V16.3.0, Sep. 2020, pp. 1-451.
CATT, "TP on TS 38.300 on MBS service continuity", 3GPP TSG-RAN WG3 #110-e R3-206302, Nov. 2-12, 2020, pp. 1-11.
3GPP, "3rd Generation Partnership Project; Technical Specification Group Services and System Aspects; Study on architectural enhancements for 5G multicast-broadcast services (Release 17)", 3GPP TR 23.757 V1.1.0, Oct. 2020, pp. 1-274.
Ericsson, "Mobility for NR MBS", 3GPP TSG-RAN WG2 #112e R2-2009960, Nov. 2-13, 2020, pp. 1-5.
Qualcomm Incorporated, "Loss-less handover procedure for NR multicast", 3GPP TSG-RAN WG3 Meeting #109e R3-206177, Aug. 17-28, 2020, pp. 1-4.

* cited by examiner

METHOD AND APPARATUS FOR MULTICAST AND BROADCAST SERVICES

TECHNICAL FIELD

Embodiments of the present application generally relate to wireless communication technology, especially to a method and apparatus for multicast and broadcast services (MBS).

BACKGROUND

In new radio (NR) release(R)17, MBS plans to focus on a small area mixed mode multicast, which is also referred to as Objective A in TR 23.757. Objective A is about enabling general MBS services over fifth generation (5G) system (5GS) and the identified use cases that could benefit from this feature. These use cases include but are not limited to: public safety and mission critical, vehicle to everything (V2X) applications, transparent internet protocol version 4 (IPv4)/internet protocol version 6 (IPv6) multicast delivery, internet protocol television (IPTV), software delivery over wireless, group communications and internet of things (IoT) applications. In these use cases, the requirements on service continuity and reliability have changed. For example, for a software download, no packet should be missed during switching from unicast to multicast or among cells (the same experience as unicast), that is, a lossless transmission is required.

In order to meet the above requirements, one objective introduced in RP-201038 is to specify support for basic mobility with service continuity, e.g., data forwarding support between a source base station (BS), e.g., a source gNB and a target gNB during a handover procedure. Accordingly, an improved technical solution for MBS should be seriously considered in view of handover.

SUMMARY OF THE DISCLOSURE

One objective of embodiments of the present application is to provide a method and apparatus for MBS, especially a method and apparatus for MBS with an enhanced data forwarding mechanism in view of handover.

According to some embodiments of the present application, an exemplary method may include: receiving MBS data associated with a user equipment (UE) in a first node, wherein the MBS data is delivered via a shared delivery mode in a wireless network; receiving, in the first node, handover acknowledge information from a second node, the handover acknowledge information indicating that a handover request associated with the UE is allowed; and determining, in the first node, whether to forward the MBS data to the second node by the first node, in response to receiving the handover acknowledge information from the second node.

In some embodiments of the present application, the method may include transmitting transmission information of the MBS data from the first node to the second node. The method may further include: receiving from the second node a data forwarding indication indicating whether to forward the MBS data to the second node, and determining whether to forward the MBS data to the second node by the first node based on the received data forwarding indication. The transmission information may be transmitted to the second node together with the handover request, and the data forwarding indication may be received from the second node together with the handover acknowledge information.

The transmission information may indicate at least one packet sequence number of the following: a highest packet sequence number of successfully delivered packets, a highest packet sequence number of transmitted packets, a packet sequence number for a first packet for which there is no sequence number yet assigned, and a bitmap of packet sequence numbers of packets for which have been successfully delivered or unsuccessfully delivered. The packet sequence number refers to a packet data convergence protocol (PDCP) count value or PDCP sequence number.

In the case that the data forwarding indication indicates not to forward the MBS data or no MBS data forwarding related information element is received, the method may include: determining not to forward the MBS data to the second node by the first node. The MBS data forwarding related information element may include transport network layer (TNL) information of a general packet radio service (GPRS) tunneling protocol (GTP) user plane (GTP-U) tunnel for forwarding of the MBS data.

In the case that the data forwarding indication indicates at least one packet sequence number of the MBS data to be forwarded, the method may include: forwarding the MBS data to the second node by the first node based on the at least one packet sequence number. The at least one packet sequence number of the MBS data to be forwarded includes one of the following: a range of packet sequence numbers of packets which are required to be forwarded, a bitmap of packet sequence number of packets which are required to be forwarded, and a packet sequence number of a last packet to be forwarded indicating the packets with a packet sequence number smaller or not larger than the indicated packet sequence number needed to be forwarded. The packet sequence number refers to a packet data convergence protocol (PDCP) count value or PDCP sequence number.

In some other embodiments of the present application, the method may include: receiving from the second node a data forwarding stop indication associated with the MBS data to the first node; and stopping forwarding the MBS data to the second node by the first node based on the forwarding stop indication. The data forwarding stop indication may further include an MBS data including a packet sequence number of a packet to be stopped. For example, the data forwarding stop indication indicates one of the following: to stop forwarding the MBS data immediately, to stop forwarding the MBS data based on the packet sequence number to be stopped, and to stop forwarding the MBS data and transmit at least one end marker packet.

In some yet other embodiments of the present application, the method may include: receiving, in the first node from a core network in the wireless network, at least one end marker packet; and stopping, in the first node, forwarding the received MBS data to the second node in response to the received at least one end marker packet.

According to some other embodiments of the present application, another exemplary method may include: receiving from a first node a handover request associated with a UE in a second node, wherein MBS data associated with the UE is delivered via a shared delivery mode in a wireless network; transmitting, from the second node to the first node, handover acknowledge information indicating that the handover request is allowed; and determining, in the second node, whether forwarding the MBS data to the second node by the first node is needed.

In some embodiments of the present application, the method may include: receiving, in the second node from the first node transmission information of the MBS data; and determining, in the second node, whether forwarding the MBS data to the second node by the first node is needed based on the transmission information. The method may further include: transmitting, from the second node to the first node, a data forwarding indication indicating whether to forward the MBS data to the second node by the first node. The transmission information may be received from the first node together with the handover request, and the data forwarding indication may be transmitted to the first node together with the handover acknowledge information.

In the case that MBS data forwarding is not needed, the method may include: transmitting, from the second node to the first node, the data forwarding indication indicating not to forward the MBS data to the second node by the first node; or not transmitting MBS data forwarding related information element to the first node by the second node.

In the case that MBS data forwarding is needed, the method may include: transmitting, from the second node to the first node, the forwarding indication indicating at least one packet sequence number of the MBS data to be forwarded.

In some other embodiments of the present application, the method may include: transmitting, from the second node to the first node, a data forwarding stop indication associated with the MBS data, wherein the data forwarding stop indication indicates one of the following: to stop forwarding the MBS data immediately; to stop forwarding the MBS data based on a packet sequence number to be stopped; and to stop forwarding the MBS data and transmit at least one end marker packet.

In some yet other embodiments of the present application, the method may include: transmitting, from the second node to a core network in the wireless network, MBS end marker assistant information, wherein the MBS end marker assistant information indicates at least one packet sequence number of the following: a packet sequence number of a last packet to be forwarded, which at least one end marker packet will be followed; a packet sequence number of a packet to be forwarded before or after at least one end marker packet; and a highest packet sequence number of missed packets in the second node. The MBS end marker assistant information is used for setting at least one end maker packet to the first node.

Some embodiments of the present application also provide an apparatus for MBS, e.g., a base station. For example, according to some embodiments of the present application, an exemplary base station includes: a wireless transceiver configured to operate in a wireless network; a processor coupled to the wireless transceiver, wherein the processor is configured: to receive MBS data associated with a UE in the base station, wherein the MBS data is delivered via a shared delivery mode in the wireless network; to receive handover acknowledge information in the base station, which indicates that a handover request associated with the UE is allowed by another base station; and to determine whether to forward the MBS data to the another base station by the base station.

According to some other embodiments of the present application, an exemplary base station includes: a wireless transceiver configured to operate in a wireless network; a processor coupled to the wireless transceiver, wherein the processor is configured: to receive from another base station a handover request associated with a UE in the base station, wherein MBS data associated with the UE is delivered via a shared delivery mode in the wireless network; to transmit, from the another base station to the base station, handover acknowledge information indicating that the handover request is allowed; and to determine, in the base station, whether forwarding the MBS data to the base station by the another base station is needed.

Embodiments of the present application can solve the technical problems on supporting service continuity in MBS, and reducing MBS data loss and duplication due to handover, and thus will facilitate the deployment and implementation of the NR.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G, 3GPP long term evolution (LTE), and so on. It is contemplated that along with the developments of network architectures and new service scenarios, all embodiments in the present application are also applicable to similar technical problems. Moreover, the terminologies recited in the present application may change, which should not affect the principle of the present application.

Figure 1:
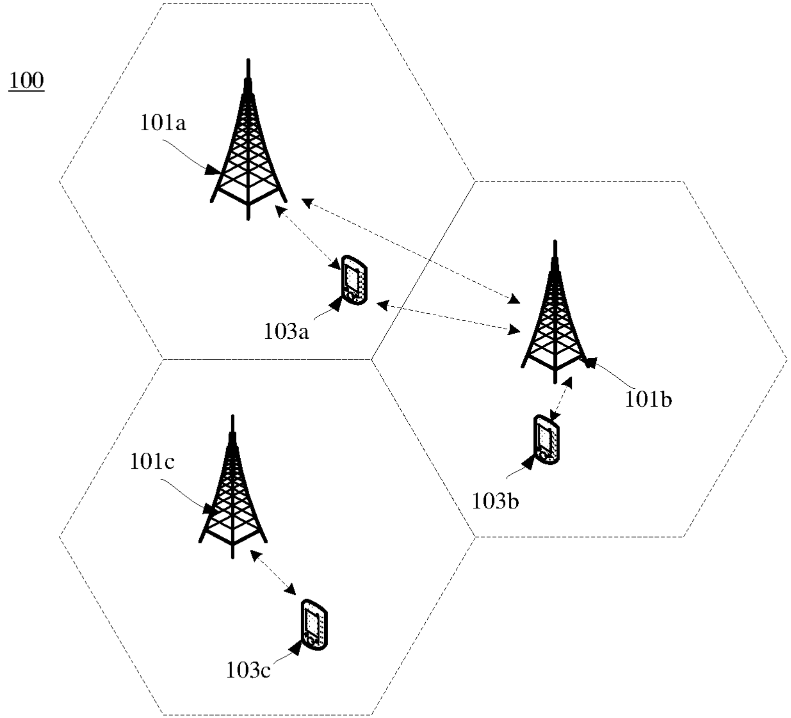
FIG. 1 is a schematic diagram illustrating an exemplary wireless communication system according to some embodiments of the present application.

FIG. 1 illustrates a schematic diagram of an exemplary wireless communication system 100 according to some embodiments of the present application.

As shown in FIG. 1, the wireless communication system 100 includes a plurality of BSs, e.g., the BS 101*a*, BS 101*b* and BS 101*c* and a plurality of UEs, e.g., the UE 103*a*, UE 103*b* and UE 103*c*. Although a specific number of BSs and UEs are illustrated in FIG. 1 for simplicity, it is contemplated that the wireless communication system 100 may include more or less BSs and UEs in some other embodiments of the present application.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The BS, e.g., the BS 101*a*, BS 101*b* and BS 101*c* may also be referred to as an access point, an access terminal, a base, a macro cell, a node-B, an enhanced node B (eNB), a gNB, a home node-B, a relay node, or a device, or described using other terminology used in the art. In 5G NR, a BS may also refer to as a radio access network (RAN) node. Each BS may serve a number of UE(s) within a serving area, for example, a cell or a cell sector via a wireless communication link. Neighbor BSs may communicate with each other as necessary, e.g., during a handover procedure for a UE.

The UE, e.g., the UE 103*a*, UE 103*b* and UE 103*c* may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE may include wearable devices, such as smart watches, fitness bands, optical head-mounted displays, or the like. Moreover, the UE may be referred to as a subscriber unit, a mobile, a mobile station, a user, a terminal, a mobile terminal, a wireless terminal, a fixed terminal, a subscriber station, a user terminal, or a device, or described using other terminology used in the art.

In NR R17, MBS was introduced to focus on a small area mixed mode multicast. According to TR 23.757, there are two MBS traffic delivery modes, i.e., individual MBS traffic delivery mode and shared MBS traffic delivery mode. Specifically, in the individual MBS traffic delivery mode, the core network (CN) receives a single copy of MBS data packets and delivers separate copies of those MBS data packets to individual UEs via per-UE physical data unit (PDU) session. In the shared MBS traffic delivery mode, the CN receives a single copy of MBS data packets and delivers a single copy of those MBS data packets to a radio access network (RAN) node, e.g., a gNB. The shared MBS traffic delivery mode is always mandatory, while the individual MBS traffic delivery mode is optionally required to support UE mobility to/from non MBS-capable RAN nodes.

In order to support lossless data transmission, during a handover procedure for a UE, e.g., a handover for the UE 103*a* from the BS 101*a* to the BS 101*b* in FIG. 1, the source RAN node, e.g., the BS 101*a* may forward all downlink MBS data that have not been acknowledged by the UE, e.g., the UE 103*a* to the target RAN node, e.g., the BS 101*b*. The downlink MBS data are associated with at least one multicast bearer or session. However, for the shared MBS traffic delivery mode, the target RAN node may have already joined the multicast group, e.g. for other UE(s) and established the MBS session resource for the MBS bearer or session. That is, the MBS data associated with the UE may also be transmitted from the CN to the target RAN node when the handover is performed, and the target RAN node may have buffered the MBS data to be forwarded. In this case, the data forwarding from the source RAN node to the target RAN node is not necessary. Thus, the legacy data forwarding mechanism cannot be applicable to MBS. An improved data forwarding mechanism in MBS is required to reduce data loss and avoid duplication forwarding.

At least for solving the above technical problems, embodiments of the present application propose an improved technical solution for MBS.

Figure 2:
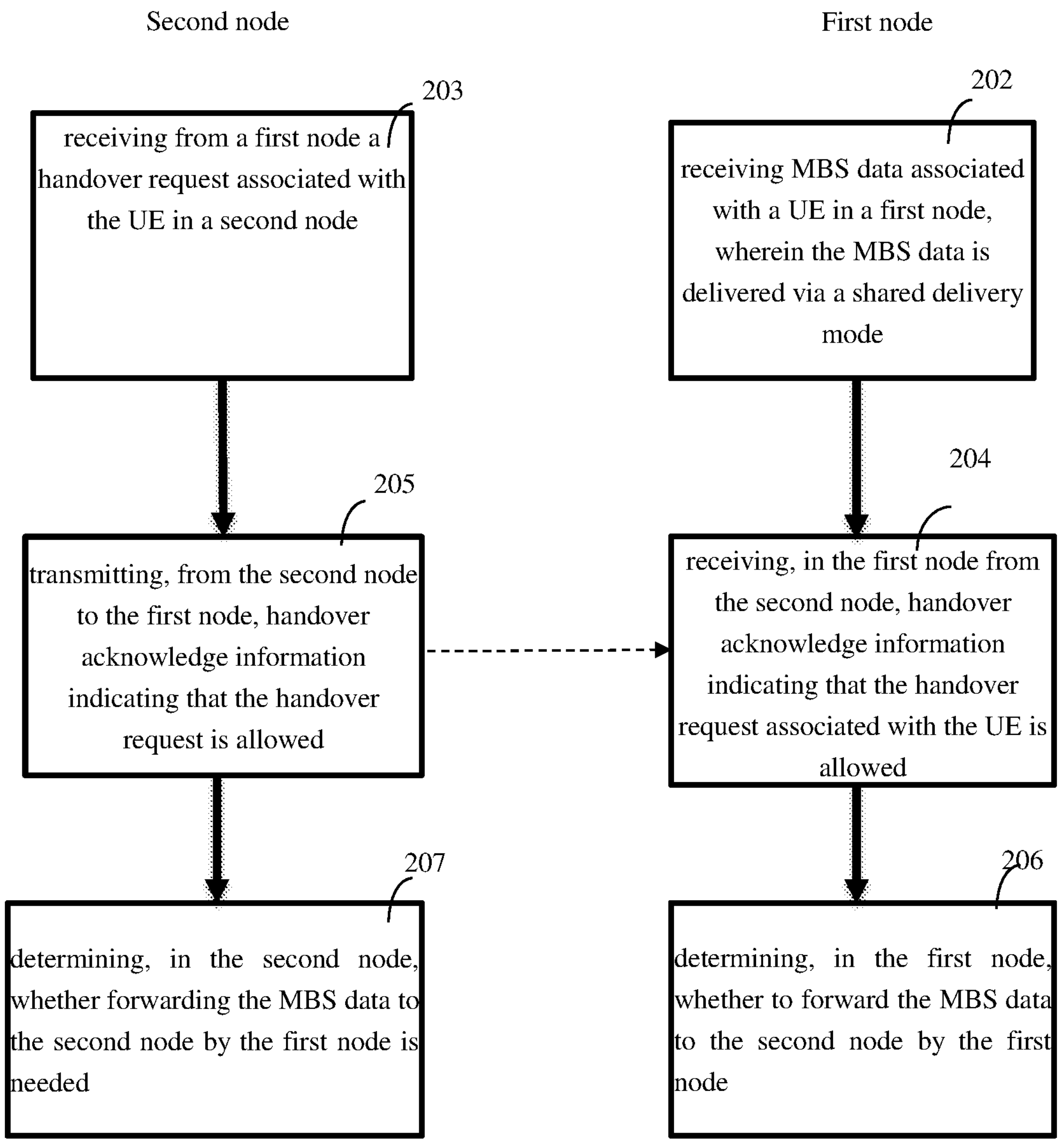
FIG. 2 is a flow chart illustrating an exemplary method for MBS according to some embodiments of the present application.

FIG. 2 illustrates a flow chart of a method for MBS according to some embodiments of the present application. Although the method is illustrated in a system level by a first node and a second node in a wireless network, persons skilled in the art well know that the method can be separately implemented and incorporated by other apparatus with the like functions. In some embodiments of the present application, the first node is a RAN node, e.g., a source gNB for a UE in view of a handover, and the second node is also a RAN node, e.g., a target gNB for the UE in view of the handover As shown in FIG. 2, an exemplary method according to some embodiments of the present application includes receiving MBS data associated with a UE in the first node in step 202, wherein the MBS data is delivered via a shared delivery mode in the wireless network. The shared delivery mode may refer to the 5G core network (5GC) shared MBS traffic delivery defined in TR 23.757 as specified above or the like. The MBS data may also be delivered to other UEs in some embodiments of the present application, for example the UEs being served by the second node. In some other embodiments of the present application, besides the MBS data delivered via the shared delivery mode, the first node may also receive unicast data for this UE or other UE(s).

Considering the movement of the UE approaching the second node, a handover from the first node to the second node may be performed for the UE. The first node will transmit a handover request to the second node for the UE. Accordingly, in step 203, the second node may receive a handover request associated with the UE from the first node. After an admission decision, the second node may allow the handover request, and then will transmit handover acknowledge information, e.g., a handover acknowledge message indicating that the handover request associated with the UE is allowed in step 205. The first node may receive the handover acknowledge information indicating that the handover request associated with the UE is allowed in step 204.

In step 206, in response to the handover acknowledge information, the first node may determine whether to forward the MBS data to the second node by the first node. Similarly, in the second node, it may determine whether forwarding the MBS data to the second node by the first node is needed in step 207. Embodiments of the present application provide various data forwarding schemes. According to different data forwarding schemes, the determination in the first node concerning on whether to forward (including stopping or cancelling the forwarding) the MBS data to the second node and the determination in the second node concerning on whether forwarding the MBS data to the second node by the first node is needed can be performed in different manners.

For example, in some embodiments of the present application, the first node may transmit transmission information of the MBS data to the second node firstly. The second node may determine whether forwarding the MBS data to the second node by the first node is needed based on the transmission information, and send a data forwarding indication to the first node, which indicates whether to forward the MBS data to the second node. For example, in the case that MBS data forwarding is not needed, the second node will transmit to the first node the data forwarding indication indicating not to forward the MBS data to the second node; or the second node will not transmit MBS data forwarding related information element to the first node. In the case that MBS data forwarding is needed, the second node may transmit to the first node the data forwarding indication indicating at least one packet sequence number (SN) of the MBS data to be forwarded. Then, the first node determines whether to forward the MBS data to the second node based on the data forwarding indication. Accordingly, in the case that the data forwarding indication indicates not to forward the MBS data or no MBS data forwarding related information element is received, the first node may determine not to forward the MBS data to the second node. In the case that the data forwarding indication indicates that the data forwarding is needed, e.g., indicating at least one packet sequence number of the MBS data to be forwarded, the first node will forward the MBS data to the second node as required, e.g., based on at least one packet sequence number of the MBS data to be forwarded.

In some other embodiments of the present application, during a handover procedure, the first node may determine to start the data forwarding as the legacy manner, while the second node may determine whether forwarding the MBS data to the second node is needed based on the received data. When the data forwarding is not needed, the second node determines to stop or cancel the data forwarding. The second node will send a data forwarding stop indication associated with the MBS data to the first node.

In some yet other embodiments of the present application, the first node may transmit transmission information of the MBS data to the second node or determine to start the data forwarding as the legacy manner. The second node may determine whether forwarding the data to the second node by the first node is needed based on the transmission information or the received data. When the second node determines to stop or cancel the data forwarding due to unnecessary data forwarding, the second node will transmit MBS end marker assistant information to the core network. The MBS end marker assistant information can be used for setting at least one end maker packet to the first node by the core network, e.g. by the user plane function (UPF). After receiving the at least one end marker packet from the core network, the first node will stop forwarding the received MBS data to the second node.

Based on the above basic solution, more details will be illustrated in various embodiments hereafter. Besides the following embodiments, persons skilled in the art should understand that: based on the legacy handover procedure and the basic solution of the present application, various embodiments of the present application can be made for MBS under the teaching and suggestion of the present application. In addition, although the following embodiments are illustrated in sequence, that does not mean these steps must be performed in the same sequence illustrated herein.

Figure 3:
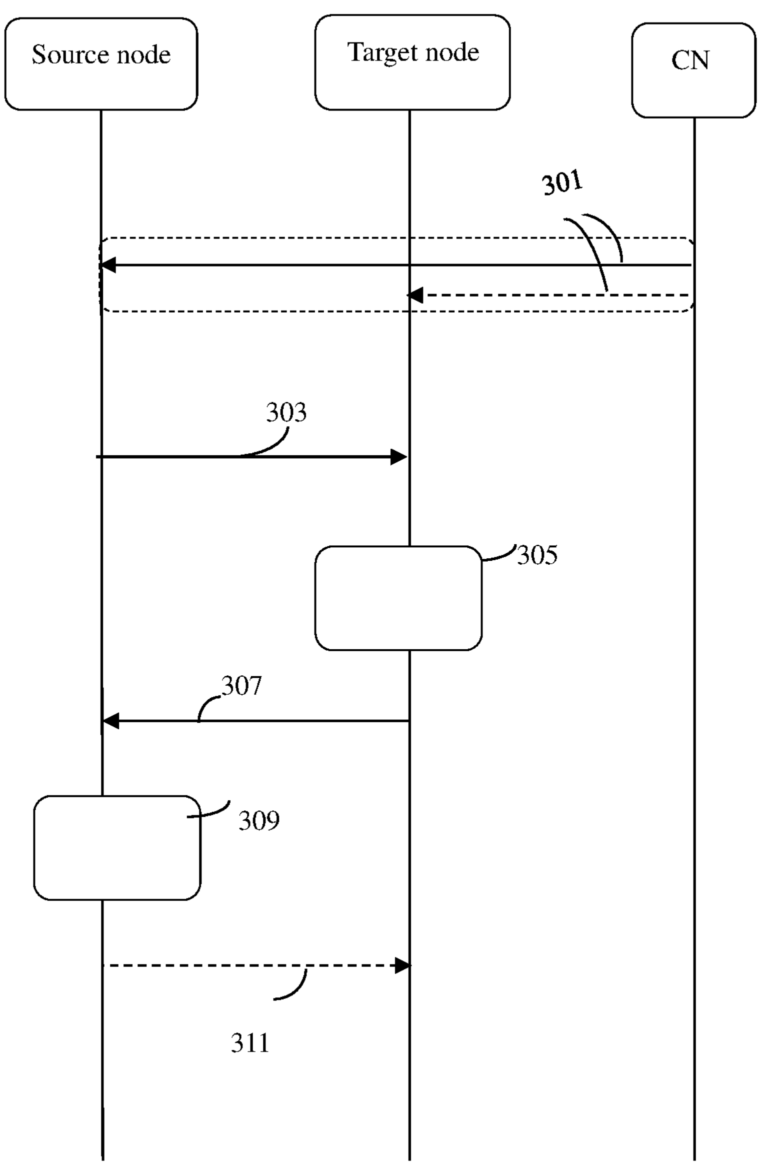
FIG. 3 is a diagram illustrating an exemplary procedure of a method for MBS according to some embodiments of the present application.

FIG. 3 is a flow chart illustrating an exemplary procedure of a method for MBS according to some embodiments of the present application.

Referring to FIG. 3, the source node is assumed to be a MBS-capable NR-RAN node, e.g., a MBS-capable gNB by which a UE is served. The UE may join a multicast group and need to receive associated MBS data from the CN via the source node. For example, in step 301, the source node receives MBS data associated with the UE from the CN, wherein the MBS data is delivered via a shared delivery mode, e.g., the 5GC shared MBS traffic delivery mode. The MBS data may be transmitted by at least one MBS bearer or at least one MBS session. Each MBS bearer or MBS session is associated with a set of packets. In some other embodiments of the present application, the CN may also transmit unicast data for the UE, which can be handled in the legacy manner, and will not repeat herein.

In the case that a handover from the source node to a target node is needed for the UE, the source node will transmit a handover request to the target node in step 303. The target node is also assumed to be a NR-RAN node, e.g., a gNB. The target node may also be MBS-capable in some embodiments of the present application, and may join the same multicast group or not. When the target node also joined the same multicast group, it will also receive the same MBS data from the CN in step 301. In some embodiments of the present application, the target node may be MBS-incapable, and will not receive the MBS data in the shared delivery mode.

Based on the received handover request, the target node will make an admission decision to determine whether to allow the handover request in step 305. When the handover request is allowed, the target node will transmit handover acknowledgement information, e.g., a handover acknowledgement message to the source node in step 307.

Considering the service continuity and lossless transmission requirement, the source node should forward data associated with the UE to the target node. However, for the MBS data delivered in the shared delivered mode, since the target node may also receive the same MBS data, data duplication transmission should also be avoided during the handover procedure to save overhead and improve efficiency of data transmission. According to some embodiments of the present application, before forwarding MBS data to the target node, the source node may transmit transmission information of the MBS data to the target node to avoid duplication data transmission to the target node. The transmission information can be transmitted to the target node together with the handover request or separately from the handover request, e.g., with the SN status transfer message after transmitting the handover request or even after receiving the handover acknowledgement information. The transmission information may indicate at least one packet sequence number of the following: a highest packet sequence number of successfully delivered packets; a highest packet sequence number of transmitted packets; a packet sequence number for a first packet for which there is no sequence number yet assigned; and a bitmap of packet sequence numbers of packets for which have been successfully delivered or unsuccessfully delivered. Herein (through the specification), the wording “delivered” means the transmitted packet to the UE has been acknowledged by the UE, while “transmitted” only means the packet has been transmitted to the UE regardless the acknowledgement from the UE. The packet sequence number is a PDCP count value or PDCP sequence number, wherein the PDCP count value is a sum of hyper frame number (HFN) and sequence number.

In response to the received transmission information, the target node may determine whether forwarding the MBS data to the target node by the source node is needed based on the received transmission information, i.e., performing a data forwarding decision. The data forwarding decision can be made together with the admission decision in step 305 or separately, e.g., after making the admission decision. The target node can compare the received transmission information of the MBS data with its own transmission information of the MBS data to determine whether forwarding the MBS data to the target node by the source node is needed.

For example, the transmission information received from the source node indicates the highest successfully delivered packet sequence number in the source node e.g., packet #200, while the first available packet in the target node is packet #203. Then, the target node may determine the data forwarding is needed, wherein, packet #201 and packet #202 need to be forwarded from the source node to the target node. In another example, the transmission information received from the source node still indicates the highest successfully delivered packet sequence number in the source node, e.g., packet #200, while the first available packet in the target node is also packet #200. That is, the target node can send its own packet #201 to the UE. Then, the target node will determine that the data forwarding is not needed.

Based on the data forwarding decision, the target node will transmit a data forwarding indication to the source node, indicating whether to forward the MBS data to the second node. According to some embodiments of the present application, the target node may transmit the data forwarding indication together with the handover acknowledge information in step 307. In some embodiments of the present application, the target node may transmit the data forwarding indication separately from the handover acknowledge information, e.g., after the handover acknowledge information.

In the case that the MBS data forwarding is not needed, the data forwarding indication may indicate not to forward the MBS data to the target node by the source node. In some other embodiments of the present application, the target node may not transmit MBS data forwarding related information element to the source node. For example, the MBS data forwarding related information element may include TNL information of a GTP-U tunnel for forwarding of the MBS data. A handover acknowledge message according to some embodiments of the present application is assumed to include MBS data forwarding related information element for indicating that MBS data forwarding is needed. Then, when the MBS data forwarding related information is not included in the handover acknowledge message, it means the data forwarding is not needed.

In the case that the MBS data forwarding is needed while the target node also joined the multicast group, the target node may transmit the forwarding indication indicating at least one packet sequence number of the MBS data to be forwarded. According to some embodiments of the present application, the at least one packet sequence number of the MBS data to be forwarded may be a range of packet sequence numbers of packets which are required to be forwarded. According to some other embodiments of the present application, the at least one packet sequence number of the MBS data to be forwarded may be a bitmap of packet sequence number of packets which are required to be forwarded. In some yet other embodiments of the present application, the at least one packet sequence number of the MBS data to be forwarded may be a packet sequence number of a last packet to be forwarded indicating the packets with a packet sequence number smaller or not larger than the indicated packet sequence number needed to be forwarded.

In some other embodiments of the present application, the target node may just transmit a data forwarding indication indicating the data forwarding to the target node by the source node is needed. For example, the target node may not buffer any MBS data associated with the UE, or the target node did not join the multicast group even it being MBS-capable, or the target node will send a data forwarding stop indication later etc.

Based on the received the data forwarding indication, the source node will determine whether to forward the MBS data to the target node in step 309. When the received data forwarding indication indicates not to forward the MBS data, the source node will not forward the MBS data. When the received data forwarding indication indicates to forward the MBS data, the source node will forward the MBS data as indicated to the target source in step 311, e.g., via an individual GTP-U tunnel (or a UE-specific GTP-U tunnel) or via a shared GTP-U tunnel.

When the data forwarding indication indicates the packet sequence number(s) of the MBS data to be forwarded, the source node will stop the data forwarding after forwarding the MBS data as required. However, in some cases, the data forwarding indication may just indicate the data forwarding is needed, or the source node determines to start the data forwarding by itself without any inquiry to the target node. The source node has to determine when to stop the data forwarding.

Regarding this issue, during a current handover procedure, the UPF in the core network will send one or more "end marker" packets on the source path immediately after switching the path for each PDU session of the UE. The "end marker" is indicated in the GTP-U header or in the GTP-U extension header. After completing the sending of the tagged packets, i.e., the one or more "end marker" packets, the UPF will not send any further user data packets associated with the UE on the source path. After receiving the "end marker" packets, the source node will, if data forwarding is activated for that bearer, forward the tagged packet(s) to the target node. In response to the detection of an "end marker" in the GTP-U header, the target node will discard the tagged packet(s) and initiate any necessary processing to maintain in sequence delivery of user data forwarded over an Xn-U interface and user data received from the UPF over a (NG interface due to the handover. In response to the detection of the "end marker", the target node may also initiate the release of the data forwarding resource.

However, for the shared delivery mode, there is no individual end maker per UE of an MBS session or bearer currently. The source node does not know when to stop the data forwarding.

Figure 4:
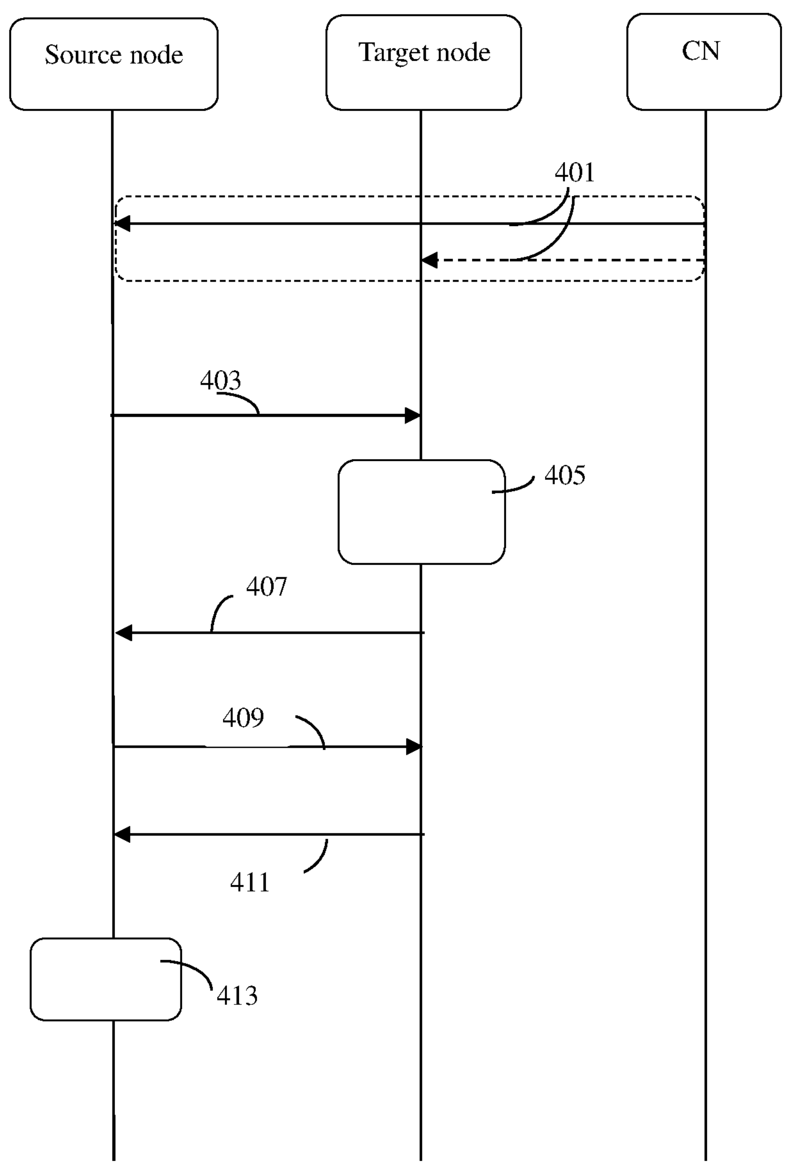
FIG. 4 is a diagram illustrating an exemplary procedure of a method for MBS according to some other embodiments of the present application.

According to some embodiments of the present application, the target node will indicate the source node when to stop the data forwarding. FIG. 4 is a flow chart illustrating an exemplary procedure of a method for MBS according to some other embodiments of the present application.

Referring to FIG. 4, the source node is assumed to be a MBS-capable NR-RAN node, e.g., a MBS-capable gNB by which a UE is served. The UE may join a multicast group and need to receive associated MBS data broadcast from the CN via the source node. For example, in step 401, the source node receives MBS data associated with the UE from the CN, wherein the MBS data is delivered via a shared delivery mode, e.g., the 5GC shared MBS traffic delivery mode. The MBS data may be transmitted by at least one MBS bearer or at least one MBS session. Each MBS bearer or MBS session is associated with a set of packets. In some other embodiments of the present application, the CN may also transmit unicast data for the UE, which can be handled in the legacy manner, and will not repeat herein.

In the case that a handover from the source node to a target node is needed for the UE, the source node will transmit a handover request to the target node in step 403. The target node is also assumed to be a NR-RAN node, e.g., a gNB. The target node may also be MBS-capable in some embodiments of the present application, and may join the same multicast group or not. When the target node also joined the same multicast group, it will also receive the same MBS data from the CN in step 401.

Based on the received handover request, the target node will make an admission decision to determine whether to allow the handover request in step 405. When the handover request is allowed, the target node will transmit handover acknowledgement information, e.g., a handover acknowledgement message to the source node in step 407.

Considering the service continuity and lossless transmission requirement, the source node should forward data associated with the UE to the target node. According to some embodiments of the present application, the source node will start to forward MBS data associated with the UE to the target node in step 409 after receiving the handover acknowledgement information as a legacy manner. In some other embodiments of the present application, the source node may start to forward MBS data associated with the UE to the target node in step 409 after receiving the data forwarding indication, which only indicates data forwarding is needed. Whatever, after receiving the forwarded data, the target node may determine to stop the data forwarding. For example, the target node may determine to stop (or cancel) the data forwarding when all missed packets have been received from the source node.

When the target node determines to stop (or cancel) the data forwarding, the target node will send a data forwarding stop (or cancel) indication to the source node 411. The data forwarding stop (or cancel) indication may include a packet sequence number to be stopped. In some embodiments of the present application, the data forwarding stop indication may indicates the first node to stop forwarding the MBS data immediately; to stop forwarding the MBS data based on a packet sequence number to be stopped; or to stop forwarding the MBS data and transmit at least one end marker packet. The source node will stop the data forwarding as indicated by the data forwarding stop indication in step 413. For example, the source node may continue the data forwarding until the packets with the indicated sequence number to be stopped. In another example, the source node may also transmit at least one end marker packet in response to stopping the data forwarding.

Figure 5:
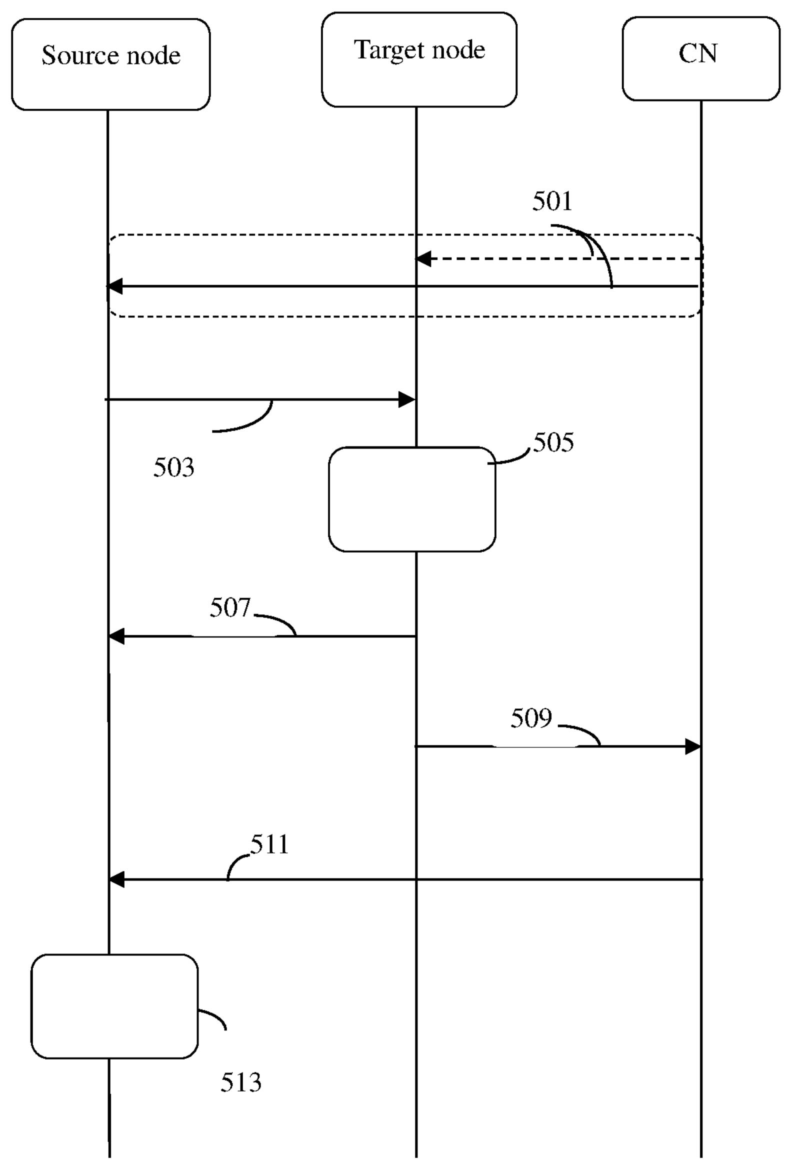
FIG. 5 is a diagram illustrating an exemplary procedure of a method for MBS according to some yet other embodiments of the present application.

According to some other embodiments of the present application, the target node will assist the core network to indicate the source node when to stop the data forwarding instead of indicating the source node when to stop the data forwarding by itself. FIG. 5 is a flow chart illustrating an exemplary procedure of a method for MBS according to some yet other embodiments of the present application.

Referring to FIG. 5, similarly, the source node is assumed to be a MBS-capable NR-RAN node, e.g., a MBS-capable gNB by which a UE is served. The UE may join a multicast group and need to receive associated MBS data broadcast from the CN via the source node. For example, in step 501, the source node receives MBS data associated with the UE from the CN, wherein the MBS data is delivered via a shared delivery mode, e.g., the 5GC shared MBS traffic delivery mode. The MBS data may be at least one MBS bearer or at least one MBS session. Each MBS bearer or MBS session is associated with a set of packets. In some other embodiments of the present application, the CN may also transmit unicast data for the UE, which can be handled in the legacy manner, and will not repeat herein.

In the case that a handover from the source node to a target node is needed for the UE, the source node will transmit a handover request to the target node in step 503. The target node is also assumed to be a NR-RAN node, e.g., a gNB. The target node may also be MBS-capable in some embodiments of the present application, and may join the same multicast group or not. When the target node also joined the same multicast group, it will also receive the same MBS data from the CN in step 501. In some embodiments of the present application, the target node may be MBS-incapable, and will not receive the MBS data in the shared delivery mode.

Based on the received handover request, the target node will make an admission decision to determine whether to allow the handover request in step 505. When the handover request is allowed, the target node will transmit handover acknowledgement information, e.g., a handover acknowledgement message to the source node in step 507.

Considering the service continuity and lossless transmission requirement, the source node should forward data associated with the UE to the target node. According to some embodiments of the present application, the source node will start to forward MBS data associated with the UE to the target node after receiving the handover acknowledgement information in a legacy manner. According to some other embodiments of the present application, considering that the target node may also receive the same MBS data, data duplication transmission should also be avoided during the handover procedure to save overhead and increase efficiency. The source node will determine whether to forward the data based on a data forwarding indication from the target node as illustrated above. However, according to some embodiments of the present application, in any case, the source node will transmit transmission information of the MBS data to the target node.

For example, as illustrated above, the transmission information can be transmitted to the target node together with the handover request or separately from the handover request, e.g., after transmitting the handover request or even after receiving the handover acknowledgement information. The transmission information may indicate at least one packet sequence number of the following: a highest packet sequence number of successfully delivered packets; a highest packet sequence number of transmitted packets; a packet sequence number for a first packet for which there is no sequence number yet assigned; and a bitmap of packet sequence numbers of packets for which have been successfully delivered or unsuccessfully delivered.

Based on the received transmission information, the target node may transmit MBS end marker assistant information to the core network in step 509. The MBS end marker assistant information is used for setting at least one end maker packet to the source node by the CN. According to some embodiments of the present application, the MBS end marker assistant information may indicate at least one packet sequence number of the following: a packet sequence number of a last packet to be forwarded, which at least one end marker packet will be followed; a packet sequence number of a packet to be forwarded before or after at least one end marker packet; and a highest packet sequence number of missed packets in the target node.

For example, the transmission information indicated the highest successfully delivered packet sequence number, e.g. packet #200, while the first available packet in the target node is packet #203. Then, the target node may indicate the highest sequence number of missed packet #202 to the CN.

After receiving the MBS end marker assistant information, e.g. in a Path Switch Request message, the UPF in the CN will send one or more "end marker" packets on the source path in step 511, wherein the one or more "end marker" packets should be before or after the indicated packet in the MBS end marker assisted information after switching the path for each PDU session of the UE. In response to receiving the one or more "end marker" packets, the source node will stop the data forwarding to the target node in step 513, e.g., transmitting the one or more "end marker" packets to the target node.

Embodiments of the present application also propose an apparatus for MBS. For example, FIG. 6 illustrates a block diagram of an apparatus 600 for MBS according to some embodiments of the present application.

Figure 6:
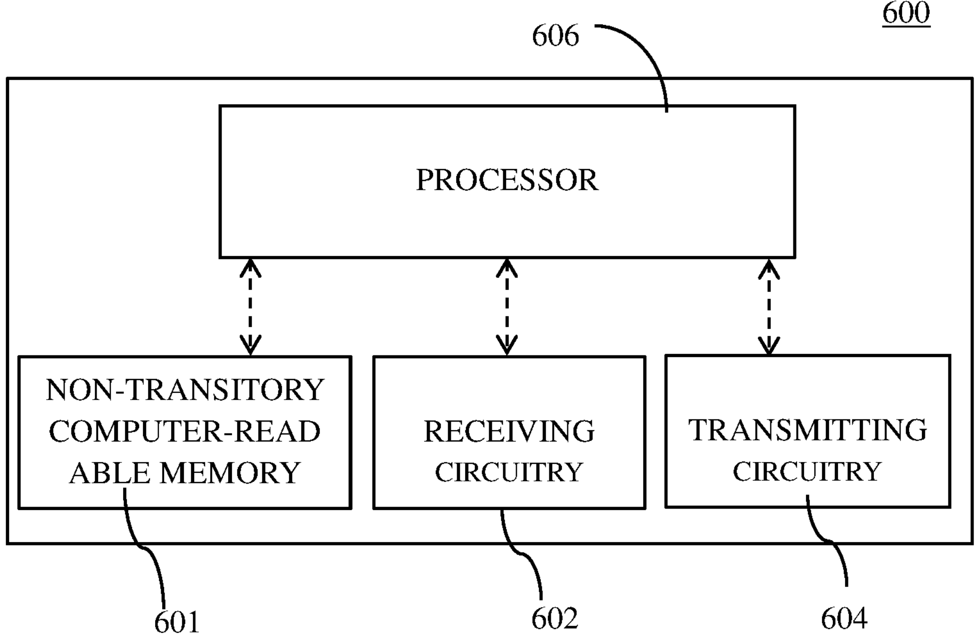
FIG. 6 illustrates a block diagram of an exemplary apparatus according to some embodiments of the present application.

As shown in FIG. 6, the apparatus 600 may include at least one non-transitory computer-readable medium 601, at least one receiving circuitry 602, at least one transmitting circuitry 604, and at least one processor 606 coupled to the non-transitory computer-readable medium 601, the receiving circuitry 602 and the transmitting circuitry 604. The apparatus 600 may be a network node, e.g., a source gNB or a target gNB configured to perform a method illustrated in any of FIGS. 2-5, or the like.

Although in this figure, elements such as the at least one processor 606, transmitting circuitry 604, and receiving circuitry 602 are described in the singular, the plural is contemplated unless a limitation to the singular is explicitly stated. In some embodiments of the present application, the receiving circuitry 602 and the transmitting circuitry 604 can be combined into a single device, such as a transceiver. In certain embodiments of the present application, the apparatus 600 may further include an input device, a memory, and/or other components.

For example, in some embodiments of the present application, the non-transitory computer-readable medium 601 may have stored thereon computer-executable instructions to cause a processor to implement the method with respect to the RAN node as described above. For example, the computer-executable instructions, when executed, cause the processor 606 interacting with receiving circuitry 602 and transmitting circuitry 604, so as to perform the steps with respect to the RAN node depicted in any of FIGS. 2-5.

Figure 7:
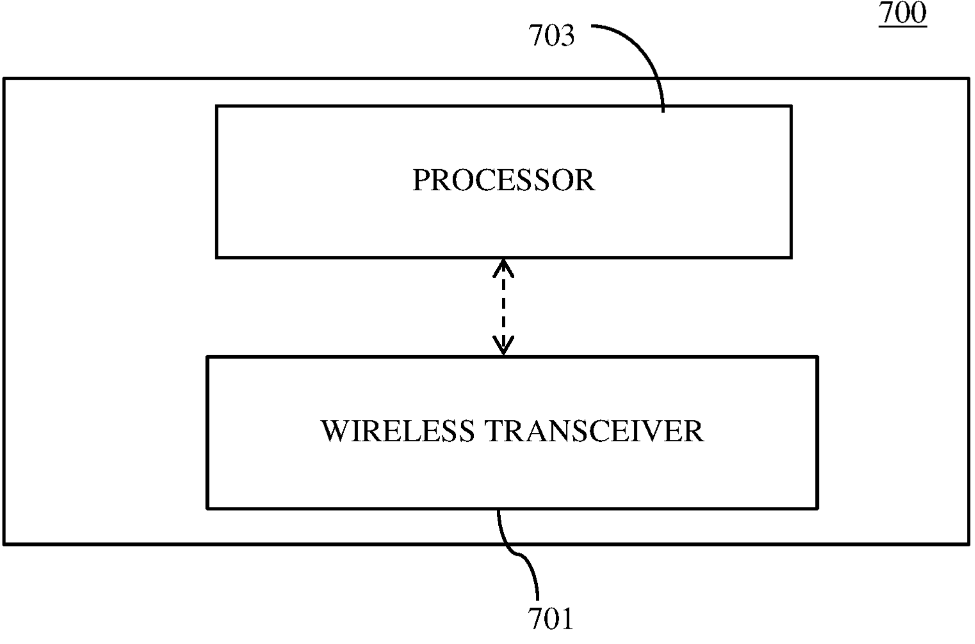
FIG. 7 illustrates a block diagram of an exemplary apparatus according to some other embodiments of the present application.

FIG. 7 illustrates a block diagram of an apparatus 700 for MBS according to some other embodiments of the present application.

As shown in FIG. 7, the apparatus 700 is a BS in some embodiments of the present application, which may include a wireless transceiver 701 configured to operate in a wireless network and a processor 703 coupled to the wireless transceiver 701. The wireless transceiver 701 can be separate wireless transmitter(s) and wireless receiver(s). The processor 703 is configured to perform a method illustrated in any of FIGS. 2-5, or the like together with the wireless transceiver 701.

For example, when the apparatus 700 is a source BS, the processor 705 may be configured: to receive MBS data associated with a UE in the BS, wherein the MBS data is delivered via a shared delivery mode in the wireless network; to receive handover acknowledge information in the BS, which indicates that a handover request associated with the UE is allowed by another BS; and to determine whether to forward the MBS data to another BS by the BS. In some other embodiments of the present application, when the apparatus 700 is a target BS, the processor 705 may be configured: to receive from another BS a handover request associated with a UE in the BS, wherein MBS data associated with the UE is delivered via a shared delivery mode in the wireless network; to transmit, from another BS to the BS, handover acknowledge information indicating that the handover request is allowed; and to determine, in the BS, whether forwarding the MBS data to the BS by the another BS is needed.

In addition, the method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for MBS, including a processor and a memory. Computer programmable instructions for implementing a method are stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

In addition, in this disclosure, relational terms such as "first," "second," and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

What is claimed:

1. A method performed by a base station, the method comprising:

receiving multicast and broadcast services (MBS) data associated with a user equipment (UE) in a first node, wherein the MBS data is delivered via a shared delivery mode in a wireless network;

transmitting transmission information of the MBS data from the first node to a second node, wherein the transmission information indicates at least one packet sequence number of the following: a highest packet sequence number of successfully delivered packets, a highest packet sequence number of transmitted packets, a packet sequence number for a first packet for which there is no sequence number yet assigned, or a bitmap of packet sequence numbers of packets for which have been successfully delivered or unsuccessfully delivered;

receiving, in the first node, handover acknowledge information from the second node, the handover acknowledge information indicating that a handover request associated with the UE is allowed; and determining, in the first node, whether to forward the MBS data to the second node in response to receiving the handover acknowledge information from the second node.

2. The method of claim 1, further comprising: if the handover acknowledge information indicates at least one packet sequence number of the MBS data to be forwarded, forwarding the MBS data to the second node by the first node based on the at least one packet sequence number.

3. The method of claim 1, further comprising:

receiving from the second node a data forwarding stop indication associated with the MBS data to the first node; and stopping forwarding the MBS data to the second node by the first node based on the forwarding stop indication.

4. The method of claim 1, comprising:

receiving, in the first node from a core network in the wireless network, at least one end marker packet; and stopping, in the first node, forwarding the received MBS data to the second node in response to the received at least one end marker packet.

5. A method performed by a base station, the method comprising:

receiving, from a first node, a handover request associated with a user equipment (UE) at a second node, wherein the handover request comprises transmission information that indicates at least one packet sequence number of the following: a highest packet sequence number of successfully delivered packets, a highest packet sequence number of transmitted packets, a packet sequence number for a first packet for which there is no sequence number yet assigned, or a bitmap of packet sequence numbers of packets for which have been successfully delivered or unsuccessfully delivered;

transmitting, from the second node to the first node, handover acknowledge information indicating that the handover request is allowed; and determining, in the second node, whether forwarding multicast and broadcast services (MBS) data to the second node by the first node is needed, wherein the MBS data is delivered via a shared delivery mode in a wireless network.

6. The method of claim 5, comprising:

transmitting, from the second node to the first node, a data forwarding indication indicating whether to forward the MBS data to the second node by the first node.

7. The method of claim 6, further comprising: if MBS data forwarding is needed, transmitting, from the second node to the first node, the data forwarding indication indicating at least one packet sequence number of the MBS data to be forwarded.

8. The method of claim 5, further comprising:

transmitting, from the second node to a core network in the wireless network, MBS end marker assistant information, wherein the MBS end marker assistant information indicates at least one packet sequence number of the following:

a packet sequence number of a last packet to be forwarded, which at least one end marker packet will be followed;

a packet sequence number of a packet to be forwarded before or after at least one end marker packet; and a highest packet sequence number of missed packets in the second node.

9. The method of claim 8, wherein the MBS end marker assistant information is used for setting at least one end maker packet to the first node.

10. A base station, comprising:

at least one memory; and at least one processor coupled with the at least one memory and configured to cause the base station to perform all of the following:

receive multicast and broadcast services (MBS) data associated with a user equipment (UE) at the base station, wherein the MBS data is delivered via a shared delivery mode in a wireless network;

transmit transmission information of the MBS data from the base station, wherein the transmission information indicates at least one packet sequence number of the following: a highest packet sequence number of successfully delivered packets, a highest packet sequence number of transmitted packets, a packet sequence number for a first packet for which there is no sequence number yet assigned, or a bitmap of packet sequence numbers of packets for which have been successfully delivered or unsuccessfully delivered;

receive handover acknowledge information at the base station, wherein the handover acknowledge information indicates that a handover request associated with the UE is allowed by another base station; and determine whether to forward the MBS data to the another base station in response to receiving the handover acknowledge information.

11. A base station, comprising:

at least one memory; and at least one processor coupled with the at least one memory and configured to cause the base station to perform all of the following:

receive, from a first node, a handover request associated with a user equipment (UE) at a second node, wherein the handover request comprises transmission information that indicates at least one packet sequence number of the following: a highest packet sequence number of successfully delivered packets, a highest packet sequence number of transmitted packets, a packet sequence number for a first packet for which there is no sequence number yet assigned, or a bitmap of packet sequence numbers of packets for which have been successfully delivered or unsuccessfully delivered;

transmit, from the second node to the first node, handover acknowledge information indicating that the handover request is allowed; and determine, in the second node, whether forwarding multicast and broadcast services (MBS) data to the second node by the first node is needed, wherein the MBS data is delivered via a shared delivery mode in a wireless network.

12. The base station of claim 11, wherein the at least one processor is configured to cause the base station to:

transmit, from the second node to the first node, a data forwarding indication indicating whether to forward the MBS data to the second node by the first node.

13. The base station of claim 12, wherein the at least one processor is configured to cause the base station to: if MBS data forwarding is needed, transmit, from the second node to the first node, the data forwarding indication indicating at least one packet sequence number of the MBS data to be forwarded.

* * * * *